United States Patent
Tong et al.

[11] Patent Number: 5,726,841
[45] Date of Patent: Mar. 10, 1998

[54] THIN FILM MAGNETIC HEAD WITH TRIMMED POLE TIPS ETCHED BY FOCUSED ION BEAM FOR UNDERSHOOT REDUCTION

[75] Inventors: Hua-Ching Tong, San Jose; Francis H. Liu, Fremont; Samuel W. Yuan, San Francisco; Vernon M. Riedlin, Jr., San Jose; Pradeep K. Thayamballi, Fremont, all of Calif.

[73] Assignee: Read-Rite Corporation, Milpitas, Calif.

[21] Appl. No.: 661,749

[22] Filed: Jun. 11, 1996

[51] Int. Cl.⁶ ............................................. G11B 5/187
[52] U.S. Cl. ............................................. 360/122; 360/126
[58] Field of Search ............................... 360/113, 119, 360/122, 126

[56] References Cited

U.S. PATENT DOCUMENTS

| | | | |
|---|---|---|---|
| 5,184,394 | 2/1993 | Hsie | 360/126 |
| 5,406,434 | 4/1995 | Amin | 360/126 |
| 5,452,166 | 9/1995 | Aylwin | 360/126 |
| 5,479,310 | 12/1995 | Atsushi | 360/126 |
| 5,576,914 | 11/1996 | Rottmayer | 360/113 |

OTHER PUBLICATIONS

Yoshida et al; "Edge Eliminated Head"; Nov.1993; pp. 3837–3839; IEEE Transactions On Magnetics, vol.29, No.6; 360/122.

*Primary Examiner*—A. J. Heinz
*Attorney, Agent, or Firm*—Nathan N. Kallman

[57] ABSTRACT

An air bearing magnetic head is formed with a trimmed head pole tip that includes first and second poles having first and second surfaces respectively, which are coplanar with the air bearing surface of the magnetic head. A pair of leading and trailing bevel surfaces are angularly formed with respect to the first and second surfaces respectively. The bevel surfaces retract portions of the head pole tip away from the surface of a storage medium, and render the head pole tip less sensitive to stray flux, resulting in readback data signals being practically free of undesirable signal undershoots and overshoots. In addition, a minute amount of pole material of the first and second surfaces are trimmed away, thereby defining stepped areas with narrow widths in the first and second poles. The stepped areas enable the magnetic head to record data with narrow and well defined track widths.

15 Claims, 11 Drawing Sheets

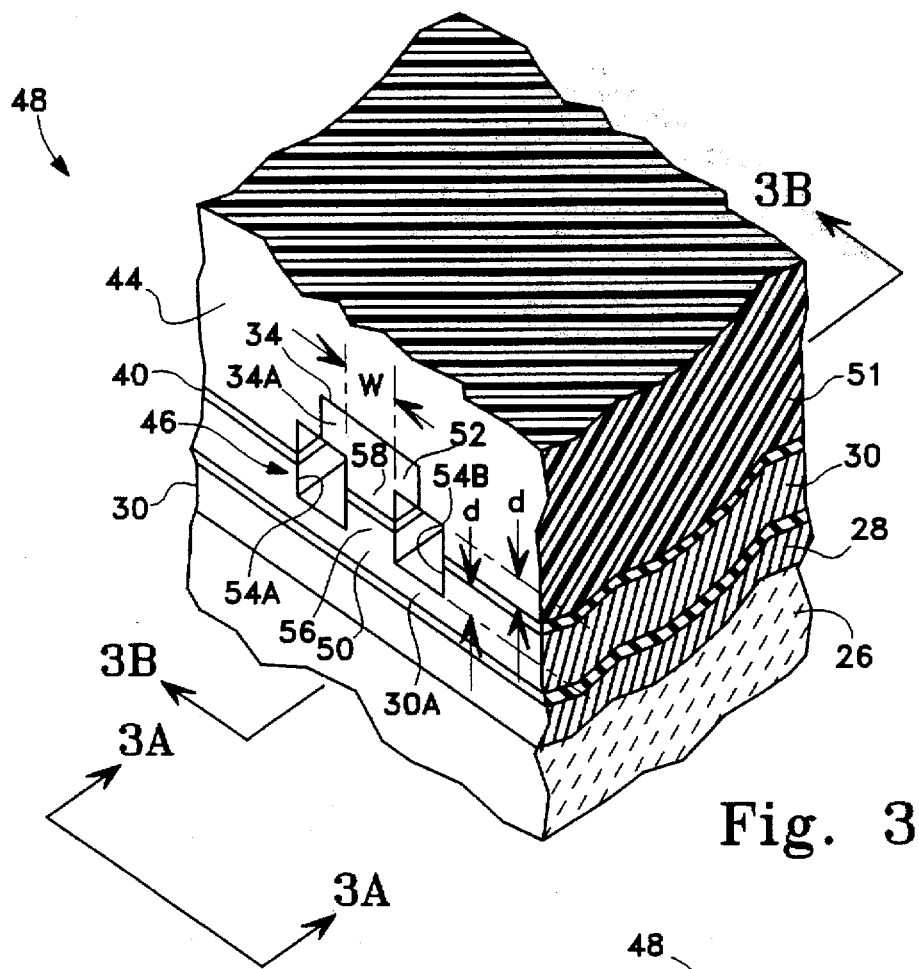
Fig. 3
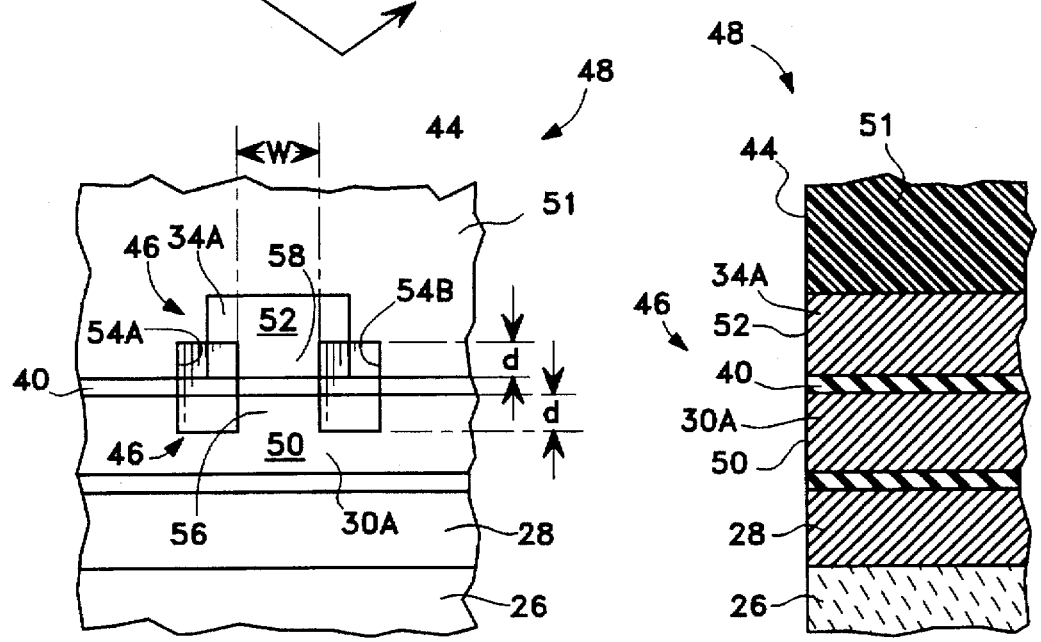
Fig. 3A
Fig. 3B

5,726,841

THIN FILM MAGNETIC HEAD WITH TRIMMED POLE TIPS ETCHED BY FOCUSED ION BEAM FOR UNDERSHOOT REDUCTION

FIELD OF THE INVENTION

This invention relates to magnetic heads and in particular to magnetic heads having trimmed poles capable of narrow width track recording with high linear densities.

BACKGROUND OF THE INVENTION

In prior art storage devices, inductive magnetic heads are commonly employed for writing and reading data. An inductive magnetic head typically comprises an inductive coil encompassed by insulation between a first magnetic pole and a second magnetic pole.

A key problem associated with the inductive head is that the readback signals obtained from the head have undershoots. The problem is illustrated with reference to FIG. 1, which shows an inductive head 2 having a first pole 8 and a second pole 10. The first pole 8 has a leading edge 11 while the second pole 10 has a corresponding trailing edge 15. During data reading, a magnetic medium 3 moves in a direction 6 and the air bearing magnetic head 2 flies above the surface 12 of the magnetic medium 3. The magnetic head 2 senses the data magnetically recorded on the track 4. FIG. 1 shows a typical readback signal 14 generated by an inductive head. The waveform 14 includes signals in the form of unwanted undershoots 22 and overshoots 20. The undershoots 22 and overshoots 20 are highly undesirable and contribute to the degradation of the signal-to-noise ratio (SNR) of the magnetic head 2. Furthermore, peak shifts in the time domain of the overshoots 20 and the undershoots 22 can cause erroneous data reading.

Detailed analysis reveals that the overshoots 20 and the undershoots 22 originate from the sharp leading and trailing edges 11 and 15, respectively, which are areas with sharp curvatures. As is known in the art, areas with sharp curvatures tend to be more concentrated in magnetic flux density. For example, suppose there is irregularly shaped magnetic flux radiating in all directions. Magnetic flux emanating from regions with sharp curvatures is higher in density than the flux from areas with a more moderate surface contour. Regions with sharp curvatures are more receptive and sensitive to surrounding flux than flat regions. Likewise, in the magnetic head 2, the trailing and leading edges 15 and 11, respectively, are sharp edges which are highly sensitive to stray flux emanating from the recording medium 3. As illustrated in FIG. 1, the magnetic head 2 reads a string of data "101" from the data track 4, for example. The waveform 14 is generated as a readback signal comprising not only the positive and negative signal peaks 16 and 18, but also a plurality of unwanted overshoots 20 and undershoots 22. The signal peaks 16 and 18 are obtained when the write gap G traverses the transitional boundaries 17 of the magnetized region signified in the directions designated by arrows 13. The undershoots 22 are caused by the leading and trailing edges 11 and 15, respectively, crossing the diverging flux lines from the magnetized regions between the boundaries 17. Thus, the magnetic head 2 cannot faithfully reproduce the readback signals from the previously written transitions at high linear density.

During fabrication, the first pole 8 is formed and is built wider in lateral dimension than the second pole 10. During data writing, the write head 2 moves relative to the data track 4 which has a track width TW that is defined predominantly by the narrower second pole 10. Due to the larger width of the first pole 8, magnetic flux fringing beyond the width of the second pole 10 is unavoidable. The fringing flux, such as flux lines F emanating from the second pole 10 to the first pole 8, would result in registering a data track width TW having ambiguous track boundaries, which adversely affects the degree of track-to-track spacing. The data track width TW can be reduced by slimming down the width of the second pole 10. However, the problem of ambiguous track boundaries still remains due to the fringing flux. Furthermore, a narrower pole may result in the pole 10 being driven into premature magnetic saturation. A magnetically saturated pole is a malfunctioning pole because it is not responsive to any additional write current.

Presently magnetoresistive (MR) sensors are used for reading data recorded by inductive write heads. An MR transducer can read information on a recording medium with much narrower track widths and operates with an improved signal-to-noise ratio. Also, the output signal generated during the read process is independent of the traveling speed of the recording medium. Consequently, a higher linear recording density per track on the recording medium is made possible.

Currently, magnetic head assemblies are designed with an inductive write transducer and a magnetoresistive (MR) sensor in a merged structure. A merged head assembly has the write transducer "piggy backed" onto the read transducer. A merged magnetic head typically includes an MR sensor disposed between a magnetic shield layer and a first pole layer. The MR sensor is separated from the shield and pole layer by insulating material. A second pole layer is deposited above the first pole layer with an inductive coil encompassed by insulating material between the pole layers.

FIG. 1A shows a prior art merged head 21 having a first pole 8' and a second pole 10. The first pole 8' is built wider in lateral dimension than the second pole 10, because, as explained before, the first pole not only acts as a pole of the inductive head but also as a shield for the MR sensor. To act as a shield, the first pole 8 needs to assume a larger width in order to effectively shield magnetic flux from the MR sensor. However, during writing, the fringing flux, such as flux lines F', emanates further beyond the width of the second pole 10. As a consequence, the data track width TW registered on the medium surface is more ambiguous.

Attempts have been made to solve the above-mentioned signal degradation problems. U.S. Pat. No. 5,479,310, Atsushi et al., entitled "Thin Film Magnetic Head Having a Variable Thickness Magnetic Layer", issued Dec. 26, 1995, teaches a magnetic head having a trapezoidal protrusion underneath the first pole to alleviate the undershoots of the written signal. The specially shaped pole is fabricated through a conventional thin film process. Considerable steps of etching and deposition are required. Similarly, U.S. Pat. No. 5,452,166, Aylwin et al., entitled "Thin Film Magnetic Recording Head for Minimizing Undershoots and a Method for Manufacturing the Same", issued Sep. 19, 1995, discloses a magnetic head having a hexagon-shaped head for reducing undershoots in the readback signals. The head is shaped by ion milling which also require considerable steps of etching and masking.

Efforts have also been made to reduce the track width of the recorded data. A common approach is to build a magnetic head with narrower poles. As mentioned before, the problem with this approach is that the pole would be easily driven into premature saturation under moderate current.

There have also been attempts to trim the magnetic poles of the magnetic heads to address this problem. Magnetic heads of this type can be found in U.S. Pat. No. 5,438,747, Krounbi et al., entitled "Method of Making a Thin Film Merged MR Head with Aligned Pole Tips", issued Aug. 8, 1995. In Krounbi et al., relying on the second pole as a mask, the first pole is trimmed by the process of ion milling the wafer surface. The trimming steps are conducted in the midst of the fabrication process. Substantial followup steps of cleaning have to be performed prior to depositing additional layers, mainly to prevent the milling residues from rupturing the overlying layers.

U.S. Pat. No. 5,402,295, to Suzuki et. al., entitled "Magnetic Recording Head Capable of Defining Narrow Track Width and Magnetic Recording Apparatus Using the Same", issued Mar. 28, 1995, discloses another magnetic head having trimmed magnetic poles. In Suzuki et al., the poles are extensively trimmed. Specifically, materials in the two poles and the adjacent areas are broadly excavated. Etching of magnetic heads by the method of ion milling requires additional steps of masking. On the other hand, if the heads are trimmed by a focused ion beam, it would be time consuming because of the large areas that need to be processed. As a consequence, manufacturing cost would be substantially increased. With the present invention, trimming minute but critical areas of the magnetic head tip effectively solves the aforementioned problems. It has been found that any additional trimming yields only a marginal advantage.

It would be desirable to solve these problems of obscure data track boundaries in merged MR and inductive write/read heads and excessive signal overshoots and undershoots in readback signals of inductive write/read heads. The problems become more severe as storage products are built with smaller physical sizes and higher storage capacities. Accordingly, there is a need to provide magnetic heads capable of writing narrow data tracks with high linear recording densities, yet also capable of reproducing high quality recorded signal without undesirable undershoots.

SUMMARY OF THE INVENTION

It is an object of the invention to provide a magnetic head capable of writing narrow data tracks so that high track recording densities can be achieved.

It is another object of the invention to provide a magnetic head which can generate high quality readback signals from magnetic media without undesirable signal undershoots so that high linear recording densities can be achieved.

It is yet another object of the invention to provide a magnetic head with simplicity in design that affords a reduction in processing steps, thereby reducing manufacturing costs.

In accordance with this invention, a magnetic head is formed with an apex that is trimmed to enable the head to write on storage media with narrow and well-defined data track widths. For an embodiment of an inductive write/read head in particular, the readback signals are practically free of undesirable signal undershoots and overshoots.

A typical inductive write/read magnetic head of the invention comprises first and second pole layers having first and second surfaces respectively, coplanar with the air bearing surface of the magnetic head. Leading and trailing bevel surfaces are angularly formed with respect to the corresponding first and second surfaces. The bevel surfaces are retracted away from the surface of the storage medium, resulting in the head pole tip being less sensitive to the stray flux from the magnetic medium. The consequential benefit is that the readback signals are practically devoid of undesirable signal undershoots and overshoots. In addition, for both MR merged heads and inductive write/read heads, minute amounts of pole material of the first and second surfaces are trimmed away. The trimmed away material defines stepped areas with narrow lateral widths in the first and second pole layers. The narrow width stepped areas allow the magnetic head to write on storage media with narrow and well defined data tracks. In addition, the likelihood of premature pole saturation is significantly reduced because only a minute amount of pole material is trimmed away.

The trimming of the bevel surfaces and the removal of material from the first and second pole layers can all be accomplished with one manufacturing step of scanning via a focused ion beam. This manufacturing step results in substantial improvement in the inventive magnetic head.

BRIEF DESCRIPTION OF THE DRAWINGS

The invention will be described in greater detail with reference to the drawing in which:

FIG. 3 is an isometric view, partly broken away, of a first embodiment of the invention having trimmed away portions of the magnetic poles for narrow data track width definition;

FIG. 3A is a front elevational view taken along the line 3A—3A of FIG. 3;

FIG. 3B is a side cross-sectional view taken along the line 3B—3B of FIG. 3;

FIG. 7 is an isometric view, partly broken away, of a third embodiment of the invention having all the features of the previous embodiments as shown in FIGS. 3–3B and FIGS. 5–5B;

Like reference numerals refer to like parts throughout the drawing.

DETAILED DESCRIPTION OF THE INVENTION

Figure 1:
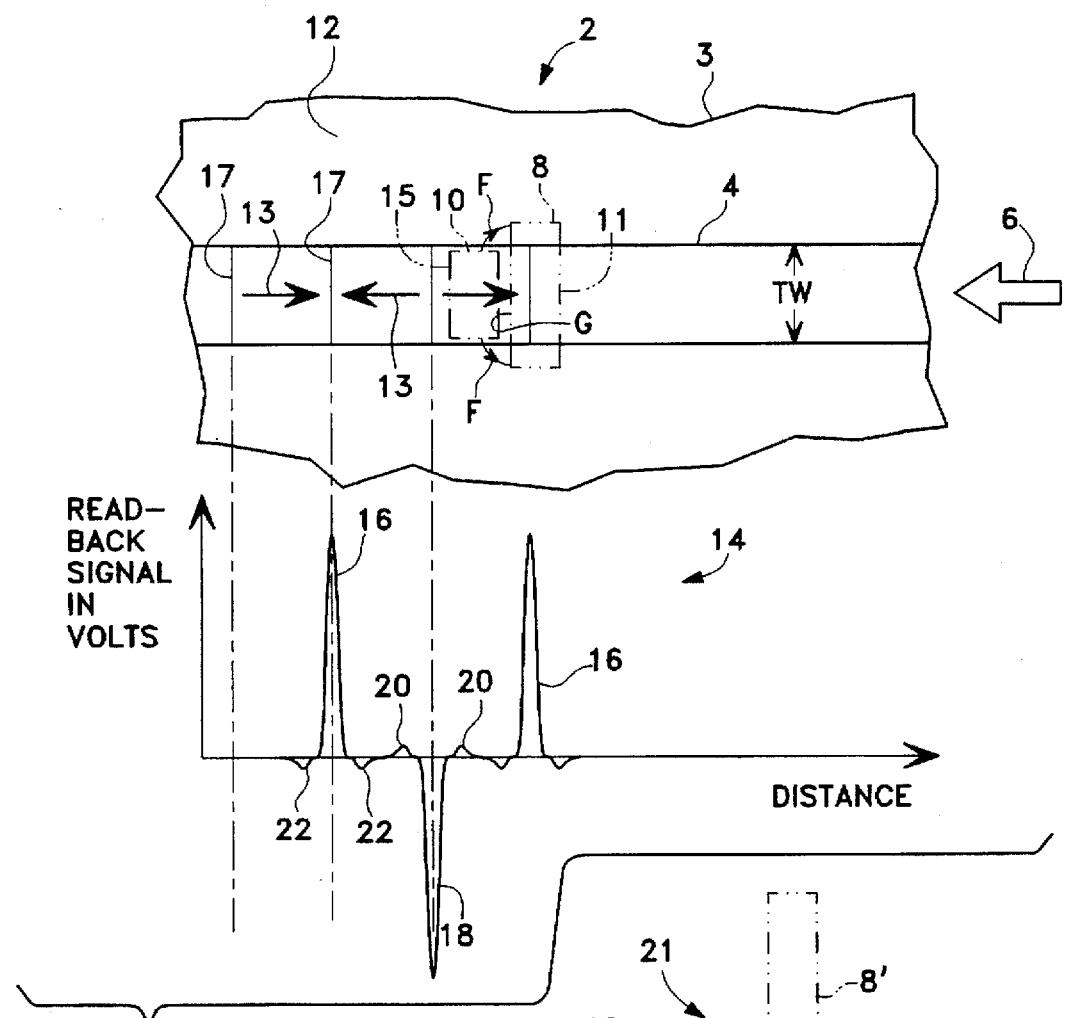
FIG. 1 is a schematic representation, partly broken away, showing the data track width, and the readback noise spikes generated by a typical prior art write/read inductive head.
Figure 1A:
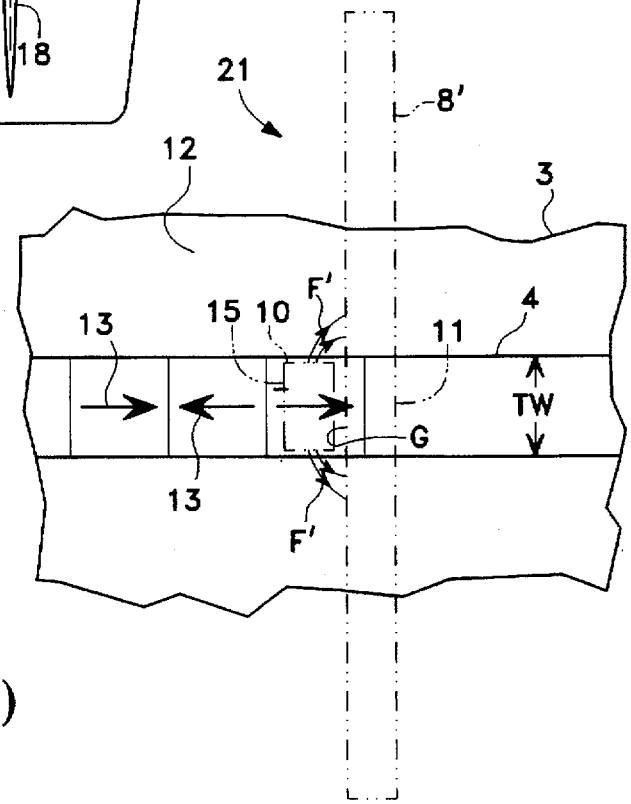
FIG. 1A is a schematic representation showing the data track width recorded by a prior art MR merged head.
Figure 2:
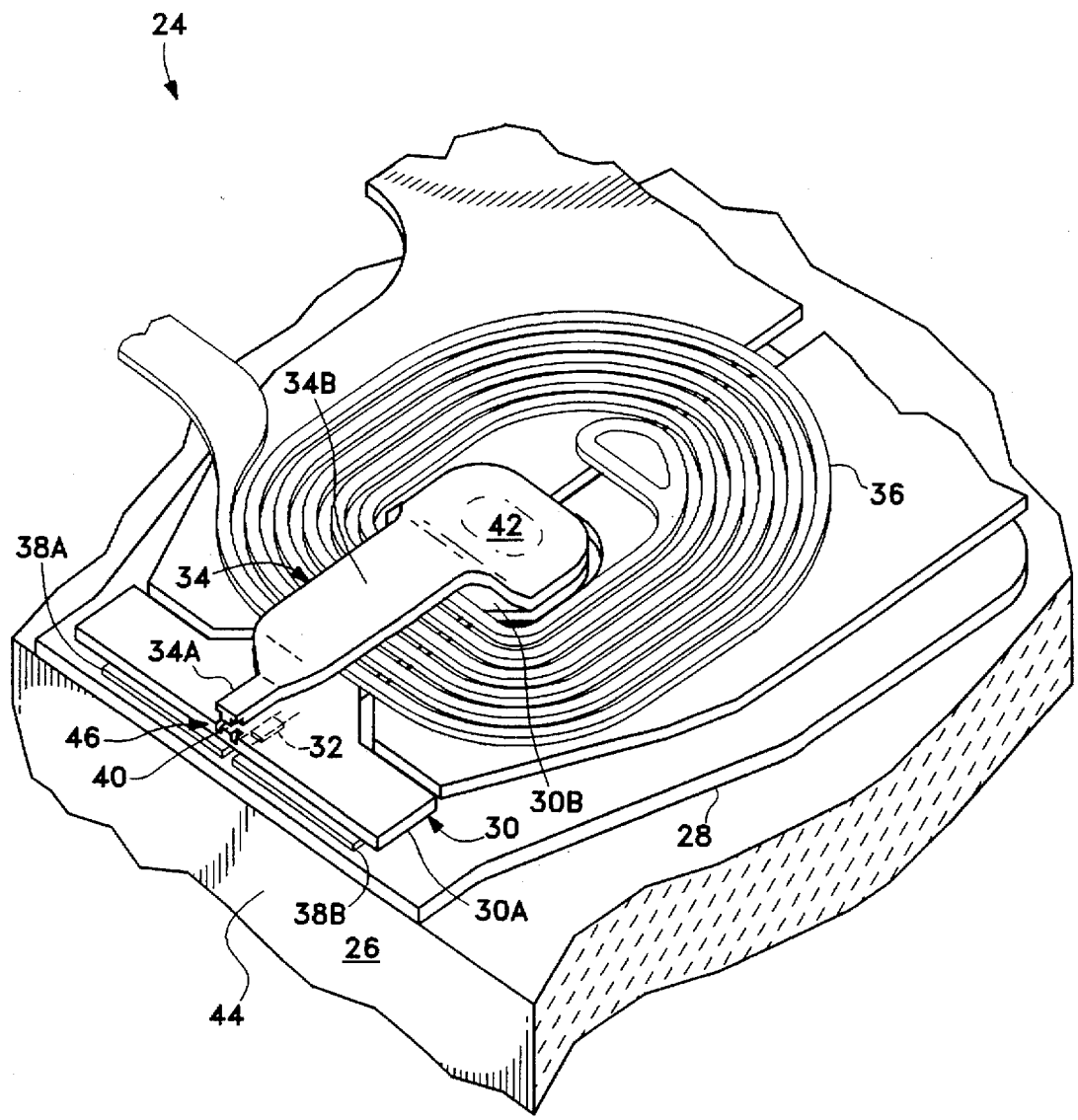
FIG. 2 is a fragmentary perspective view of a merged magnetic MR head, made in accordance with the invention.

In the embodiment depicted in FIG. 2, a magnetic head assembly 24 comprises a merged head built on a substrate 26, which is preferably made of a ceramic material that is insulating and nonmagnetic. For the sake of clarity, the protective and insulating layers are not shown thereby exposing all the relevant components of the magnetic head 24. A magnetic shield layer 28 is disposed over the substrate 26. Disposed between the magnetic shield layer 28 and a first pole 30 is an MR sensor 32. An inductive coil 36 is sandwiched between the first pole 30 and a second pole 34. Electrical leads 38A and 38B are connected to the MR sensor 32 for conveying sensed signals to an amplifier (not shown) for signal amplification. The sensor 32 can be an anisotropic MR (AMR) sensor or a giant MR (GMR) sensor.

The first pole 30 includes a front section 30A integrally joined to a back section 30B. The first pole 30 serves as a shield for the magnetoresistive sensor 32 as well as a magnetic pole. The second pole 34 includes a pole tip section 34A and a body section 34B. The pole tip section 34A is disposed adjacent to the front section 30A of the first pole 30 separated by an insulating gap layer 40. The body section 34B of the second pole 34 is disposed in contact with the back section 30B of the first pole 30 through a back gap region 42. The first and second poles 30 and 34 form a closed magnetic path with the insulating gap layer 40.

The front section 30A of the first pole 30 and the pole tip section 34A of the second pole 34 are flush with an air bearing surface 44 of the magnetic head 24. During operation, the magnetic head 24 flies over a storage medium, such as a magnetic disk (not shown) with the air bearing surface parallel to the surface of the disk, separated only by a thin film of air. The pole tip section 34A of the second pole 34 in conjunction with the immediate area of the front section 30A of the first pole 30 form a head pole tip 46 which is trimmed to a specific shape.

Figure 2A:
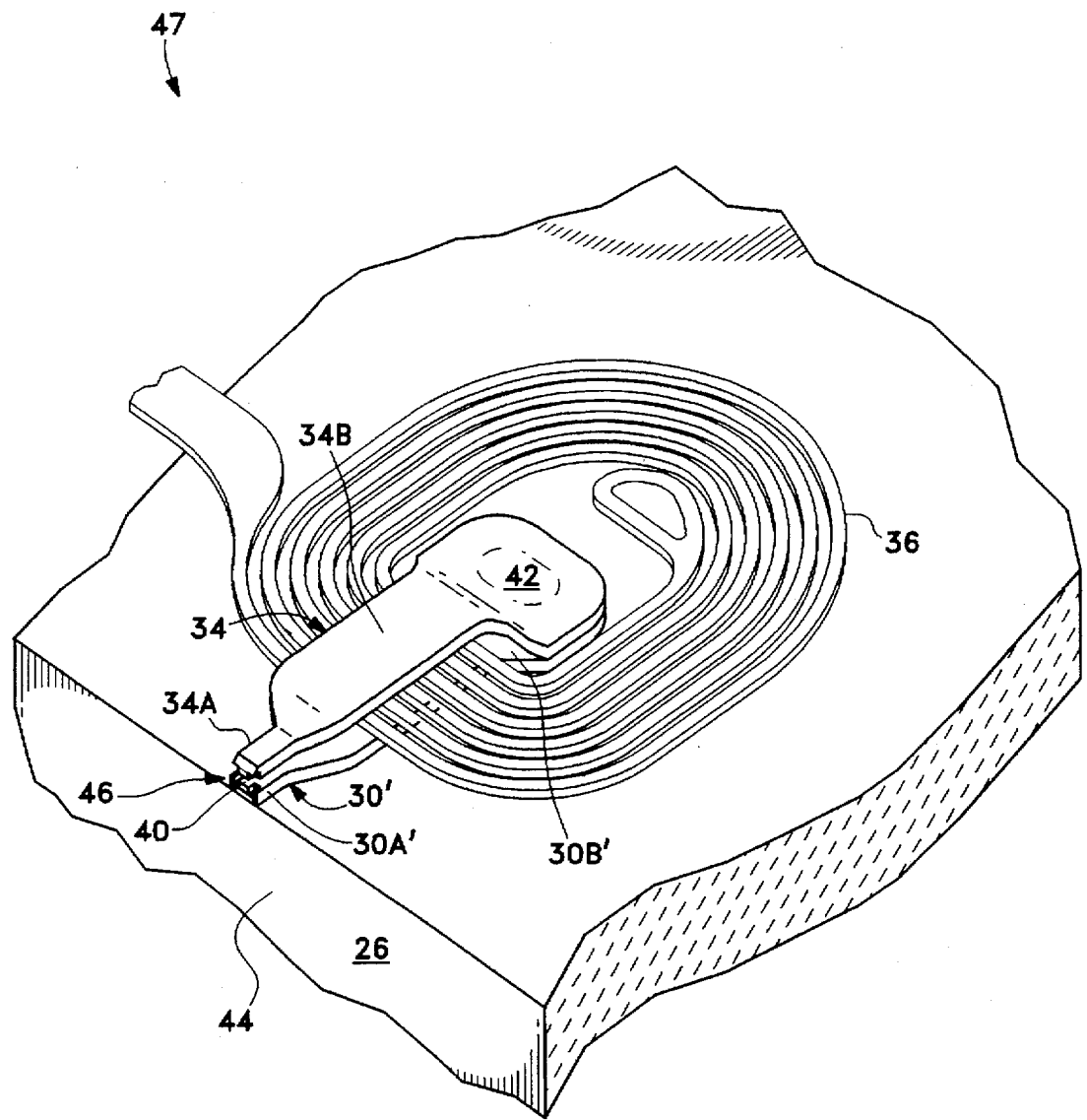
FIG. 2A is fragmentary perspective view of an inductive write/read magnetic head, made in accordance with the invention.

The magnetic head assembly of FIG. 2A includes an inductive write/read head 47, which has inductive coil 36 disposed between a first pole 30' and a second pole 34. The inductive head of FIG. 2A does not include the magnetic shield layer 28, the electrical leads 38A and 38B and the read sensor 32 of FIG. 2.

FIG. 3 shows a first embodiment of a magnetic head 48 of this invention. The areas surrounding the magnetic head pole tip 46 are shown in an enlarged fragmentary view having all the protective layers, such as a protective overcoat layer 51, and other insulating layers. FIG. 3A is a front elevational view taken along the line 3A—3A of FIG. 3. FIG. 3B is a cross-sectional side view taken along the line 3B—3B of FIG. 3. The magnetic head 48 of this embodiment comprises the front section 30A having a first level surface 50 coplanar with the air bearing surface 44. Similarly, the pole tip section 34A of the second pole 34 includes a second level surface 52 coplanar with the air bearing surface 44. Disposed between the front section 30A and the tip section 34A is the insulating gap layer 40.

In keeping with this invention, at the air bearing surface 44 of the magnetic head 48, there are trimmed away portions 54A and 54B located between the front section 30A and the pole tip section 34A. The trimmed away portions 54A and 54B define a first stepped area 56 in the first surface 50 adjacent to and extending toward the insulating gap layer 40. In a similar manner, the trimmed away portions 54A and 54B define a second stepped area 58 in the second surface 52 adjacent to and extending toward the insulating gap layer 40. Each of the first and second stepped surfaces 56 and 58 includes a lateral width W which is smaller than the dimension of the rest of the first and second surfaces 50 and 52, respectively. The trimmed away portions 54A and 54B basically reduce the fringing flux between the front and pole tip sections 30A and 34A of the first and second poles 30 and 34, respectively. Accordingly, the lateral width W of the stepped areas 56 and 58 define the data track widths with higher resolution on the record medium. The lateral width W can be adjusted to any value, if accompanied by proper compensation of the flying height of the magnetic head 48 above the record medium.

Figure 4:
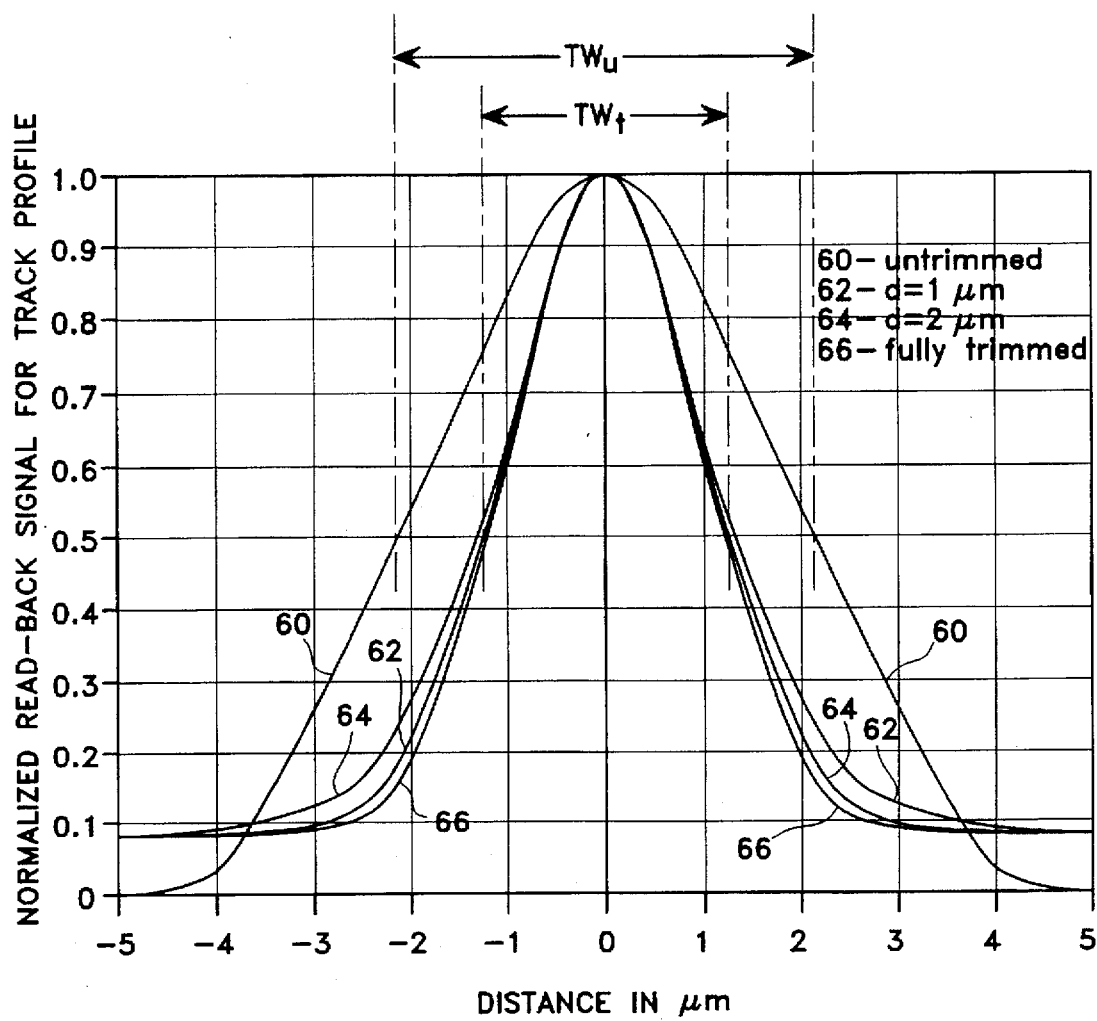
FIG. 4 is graphical representation of track profiles recorded on a storage medium by an untrimmed magnetic head, and a trimmed magnetic head as shown in FIGS. 3–3A at various trimmed heights.
Figure 4A:
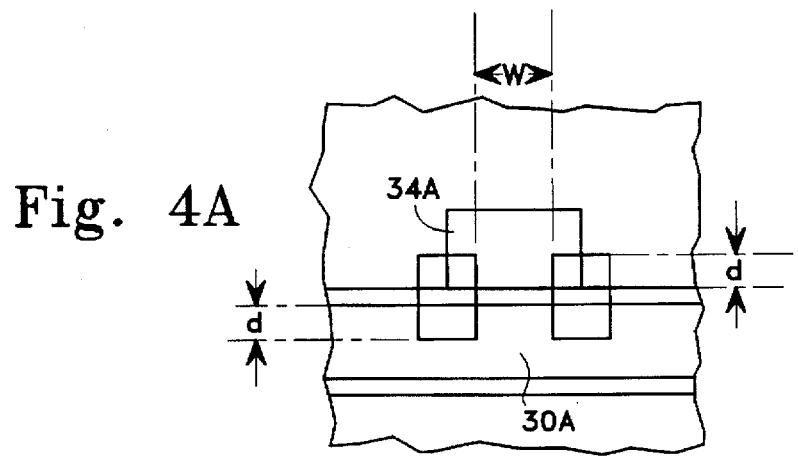
FIG. 4A is a schematic drawing, in part, defining the trimmed height, d, of the magnetic head shown in FIGS. 3–3B.

Extensive measurements have been conducted to study the effect of trimmed height d in relationship to the written data track width TW. Data tracks written by magnetic heads having the head pole tip 46 trimmed at various heights d are transversely swept by a read sensor. The readback electrical signals in volts were plotted on the y-axis against the trimmed heights d of the writing head on the x-axis. The results are shown in FIG. 4. FIG. 4A is a schematic view graphically defining the trimmed height d. In FIG. 4, the data track width is measured at 0.5 of the normalized amplitude. The data track widths written by untrimmed and trimmed heads are illustrated and signified by widths $TW_u$ and $TW_t$, respectively. As can been seen in FIG. 4, profile 60 is the readback result of an untrimmed head while profile 66 is that of a fully trimmed head. Profiles 62 and 64 respectively represent heads with trimmed heights of 1 µm and 2 µm, respectively. FIG. 4 clearly illustrates the fact that there is no need to trim the trimmed away portions 54A and 54B to excessive heights. A magnetic head of a gap length of about 0.25 µm with a trimmed height of about 1 µm or 2 µm almost attains the benefits of a fully trimmed head. Contrary to prior art approaches, there is no need to remove large portions of the head pole tip 46 employing elaborate schemes such as ion milling, and various wet or dry etchings. Using a focused ion beam and swiftly removing a minute amount of material (trimmed height=4 times the gap length) at the head pole tip 46 can provide the desired benefits.

Figure 5:
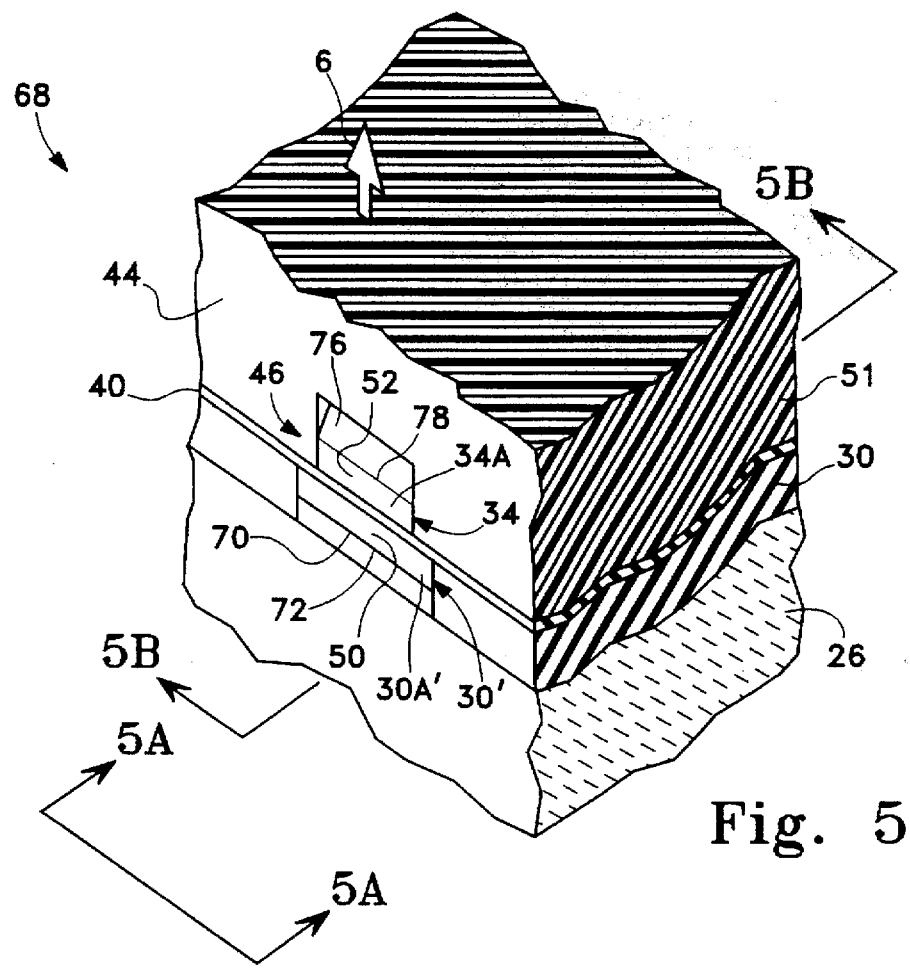
FIG. 5 is an isometric view, partly broken away, of a second embodiment of the invention having bevel surfaces in the magnetic poles for providing undershoot reduction.
Figure 5A:
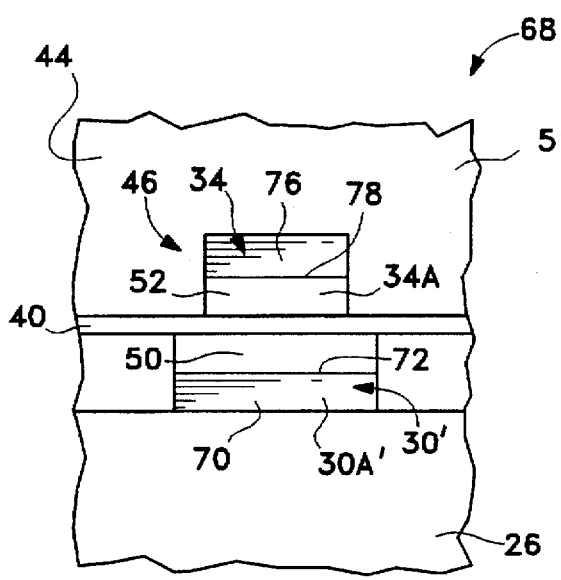
FIG. 5A is a front elevational view taken along the line 5A—5A of FIG. 5.

FIG. 5 shows a second embodiment of the invention. The magnetic head 68 of this embodiment is an inductive write/read head which includes a head pole tip 46 trimmed in an unique manner resulting in the magnetic head 68 being capable of reading data practically free of unwanted undershoots and overshoots. As with the previous embodiment, the areas surrounding the magnetic head pole tip 46 are shown in an enlarged fragmentary view having all the protective and insulating layers included. FIG. 5A is a front elevational view taken along the line 5A—5A of FIG. 5.

Figure 5B:
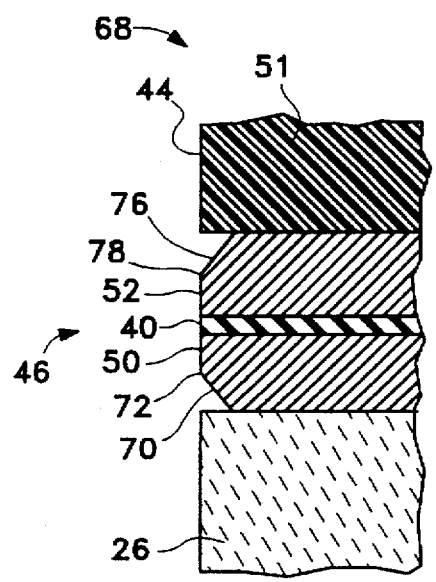
FIG. 5B is a side cross-sectional view taken along the line 5B—5B of FIG. 5.

FIG. 5B is a cross-sectional side view taken along the line 5B—5B of FIG. 5. The magnetic head 68 of this embodiment comprises the front section 30A of the first pole 30 having a first surface 50 coplanar with the air bearing surface 44. Similarly, the pole tip section 34A of the second pole 34 includes a second surface 52 coplanar with the air bearing surface 44. Disposed between the front section 30A and the pole tip section 34A is the insulating gap layer 40.

The front section 30A' of the first pole 30' includes a leading bevel surface 70 angularly formed with respect to the first surface 50. The two surfaces 50 and 70 intersect at a leading edge 72. In this embodiment, the leading edge 72 is substantially perpendicular to the direction of motion of arrow 6 of the record medium. In a similar fashion, the tip section 34A of the second pole 34 includes a trailing bevel surface 76 angularly formed with respect to the second surface 52. The two surfaces 52 and 76 intersect at a trailing edge 78. In this embodiment, the trailing edge 78 is substantially perpendicular to the direction of motion of the record medium 6.

Figure 6A:
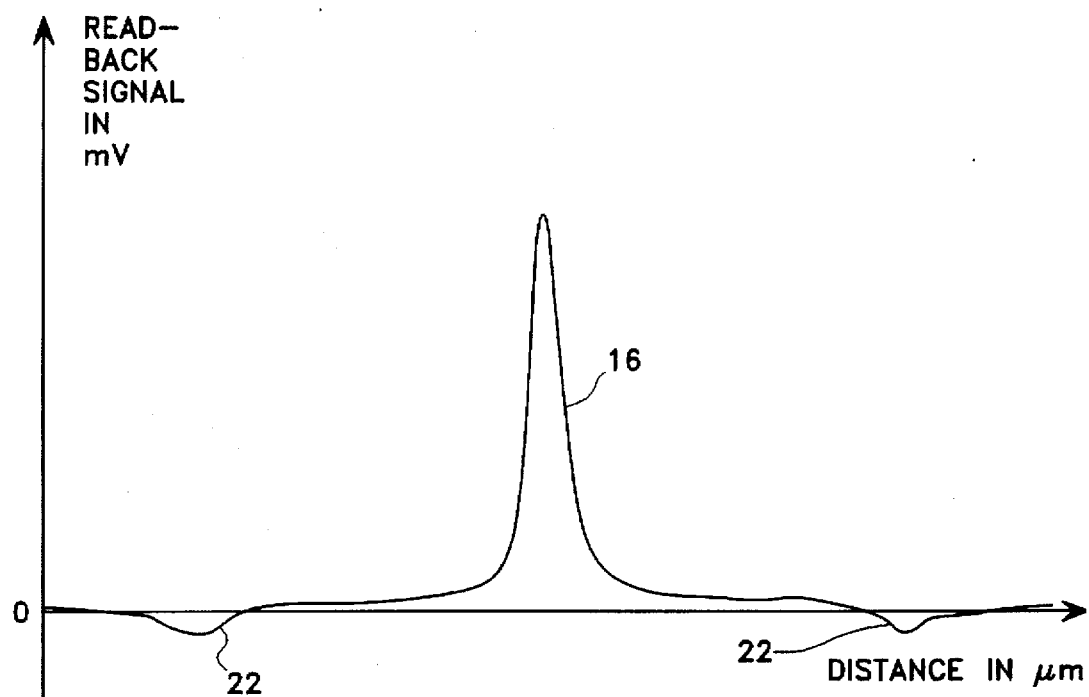
FIG. 6A is graphical representation of a readback signal detected by a prior art inductve write/read head.
Figure 6B:
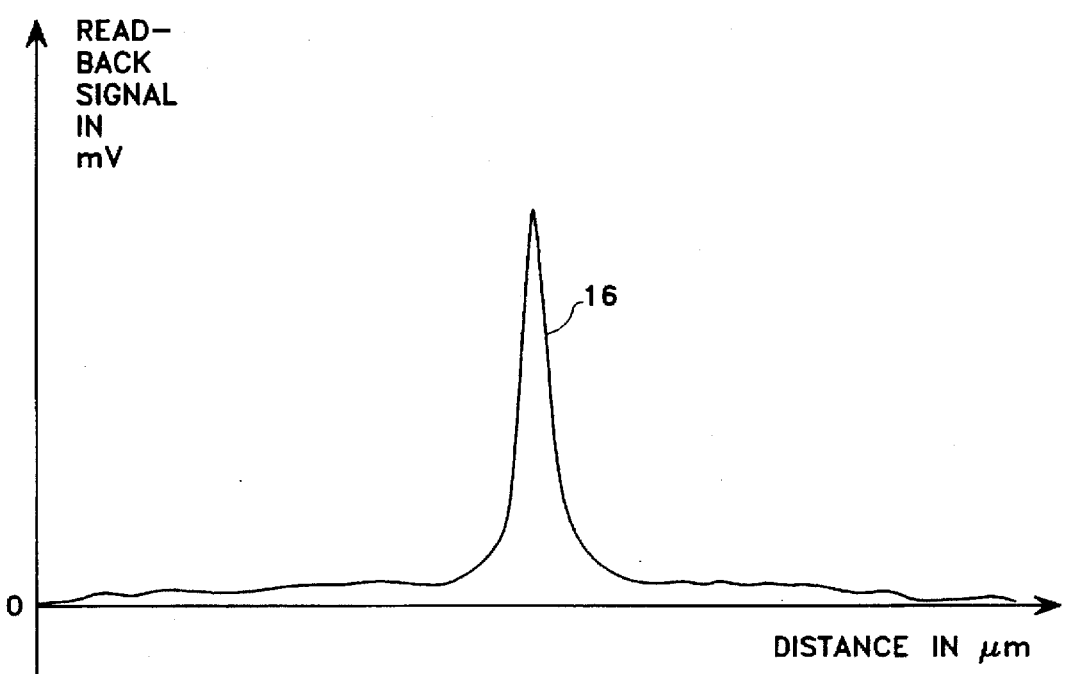
FIG. 6B is graphical representation of a readback signal detected by a inductive write/read head of the invention as shown in FIGS. 5–5B.

The bevel surfaces 70 and 76 basically retract the respective front section 30A' and the tip section 34A away from the record medium and render the sections 30A' and 34A less sensitive to stray flux. As a comparison, shown in FIG. 6A is the readback signal of a data track written by an untrimmed head, while shown in FIG. 6B is that of a trimmed head. As can be seen from FIG. 6B, the undershoots are practically eliminated, while the undershoots 22 in FIG. 6A are clearly evident. Although FIGS. 6A and 6B show only positive signal peaks 16, it should be appreciated that the same holds true for the negative signal peaks. The bevel surfaces 70 and 76 enable the magnetic head 68 to read a magnetic medium free of the undesirable undershoots or overshoots, resulting in higher SNR and less susceptibility to data error.

The bevel surfaces 70 and 76 can be formed by repeatedly scanning the selected areas of the head pole tip 46 via a focused ion beam, in which the deeper portion requires more scanning repetitions than the shallower portion. Alternatively, the head pole tip 46 can be scanned with varying ion dosage, that is, the deeper portion is scanned with higher dosage than the shallower portion.

Figure 7A:
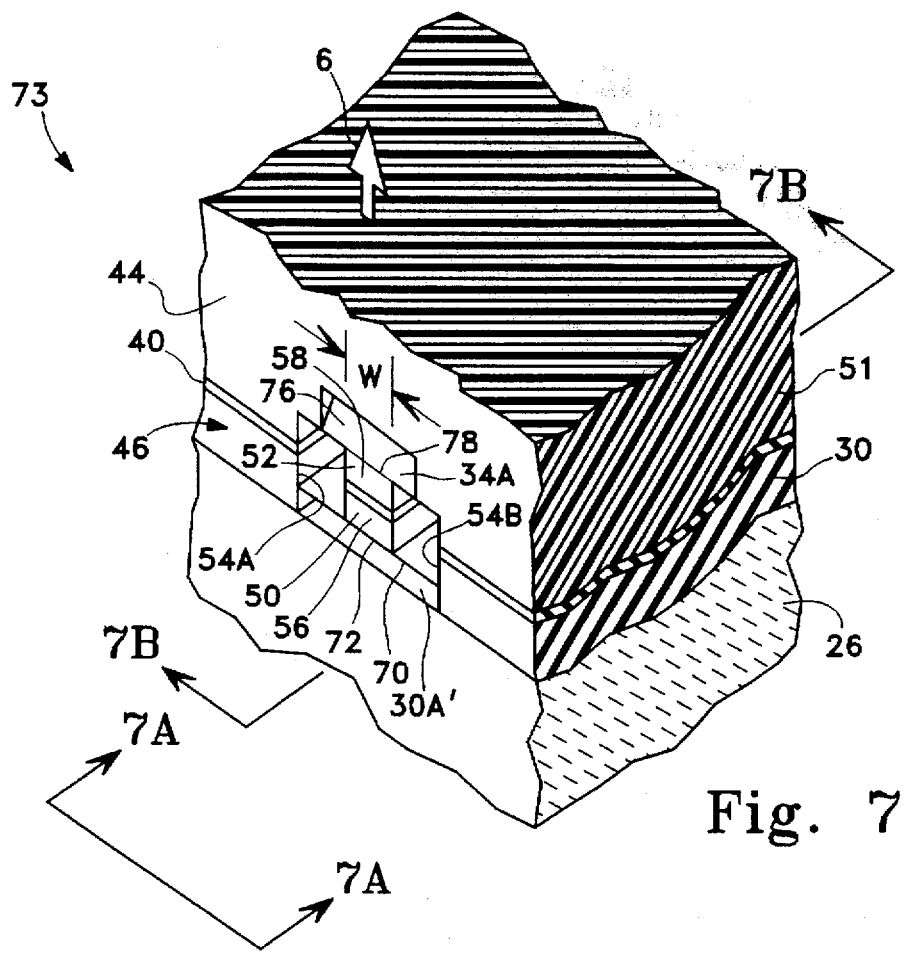
FIG. 7A is a front elevational view taken along the line 7A—7A of FIG. 7.
Figure 7A:
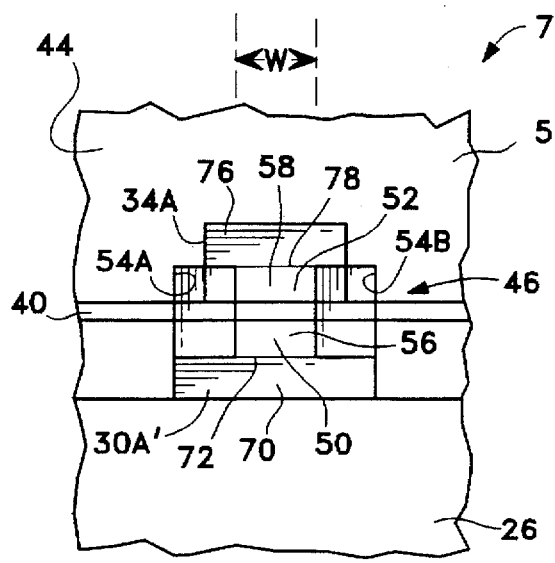
Figure 7B:
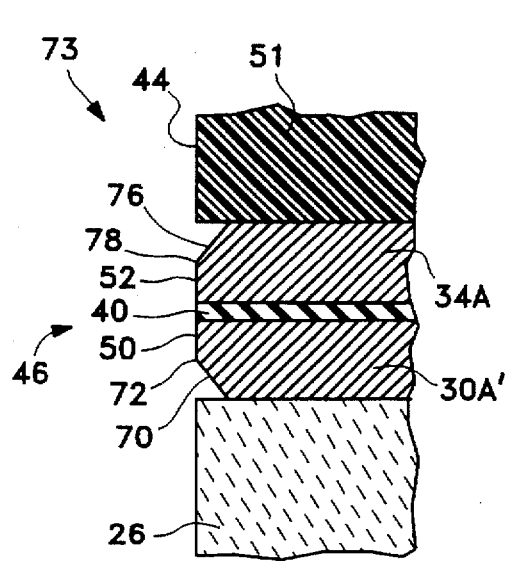
FIG. 7B is a side cross-sectional view taken along the line 7B—7B of FIG. 7.

FIG. 7 shows a third embodiment of the invention. The magnetic head 73 is ideal for high performance products requiring ultra-narrow data track widths and high linear record densities. As with the previous embodiments, the magnetic head 73 includes a first surface 50 in the front section 30A of the first pole 30. The surface 50 is coplanar with the air bearing surface 44. Similarly, the tip section 34A of the second pole 34 comprises a second surface 52 which is also coplanar with the air bearing surface 44. Disposed between the front section 30A and the tip section 34A is the insulating gap layer 40. There are trimmed away portions 54A and 54B located between the front section 30A and the tip section 34A. The trimmed away portions 54A and 54B define a first stepped area 56 in the first surface 50 adjacent to and extending toward the insulating gap layer 40. In a similar manner, the portions 54A and 54B define a second stepped area 58 in the second surface 52 adjacent to and extending toward the insulating gap layer 40. Each of the first and second stepped surfaces 56 and 58 includes a lateral width W which is no wider than the remaining portions of the first and second surfaces 50 and 52, respectively.

The transducer or magnetic head 73 also includes a leading bevel surface 70 angularly formed with respect to the first surface 50. The two surfaces 50 and 70 intersect at a leading edge 72 which, in this embodiment, is substantially perpendicular to the direction of motion 6 of the record medium (not shown). In a similar fashion, the tip section 34A of the second pole 34 includes a trailing bevel surface 76 angularly formed with respect to the second surface 52. The two surfaces 52 and 76 intersect at a trailing edge 78 which is also substantially perpendicular to the direction of motion indicated by arrow 6 of the record medium in this embodiment.

The magnetic head 73, with the trimmed portions 54A and 54B, is capable of writing narrow data tracks substantially defined by the lateral width W. In addition, the bevel surfaces 72 and 76 enable the head 76 to read data signal from a record medium free of undesirable undershoots. The operational details of this embodiment are substantially similar to those of the previous embodiments described above. For the sake of conciseness and clarity, they are not repeated herein. However, it should be emphasized that the trimmed away portions 54A and 54B, and the bevel surfaces 72 and 76 can all be formed with one manufacturing step of focused ion beam trimming.

Figure 8:
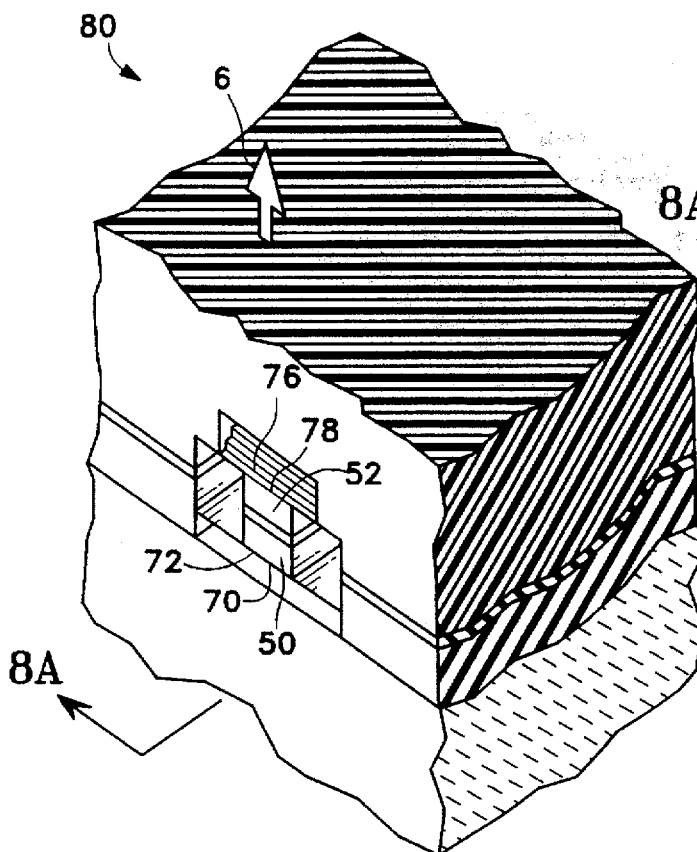
FIG. 8 is another variation of the embodiment shown in FIGS. 7-7B.
Figure 8A:
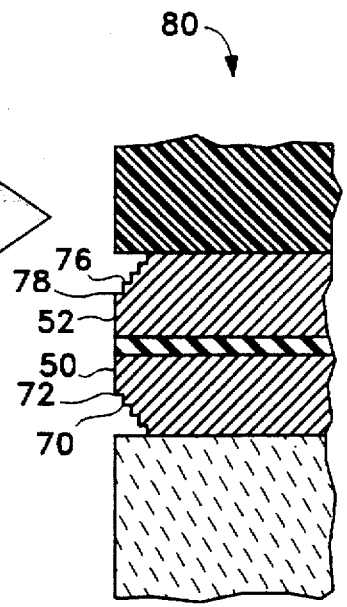
FIG. 8A is a cross-sectional view taken along the line 8A—8A of FIG. 8.
Figure 9:
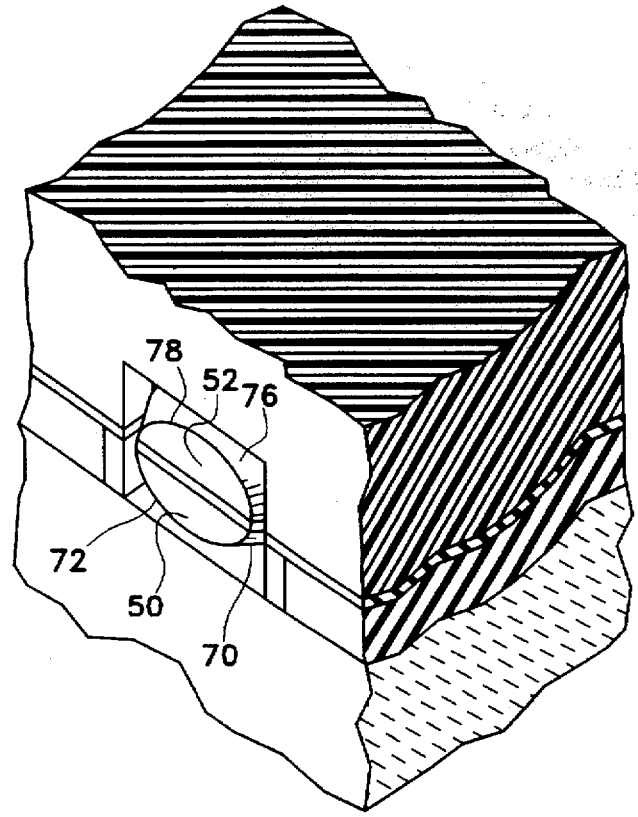
FIG. 9 is yet another variation of the embodiment shown in FIGS. 5-5B.
Figure 10:
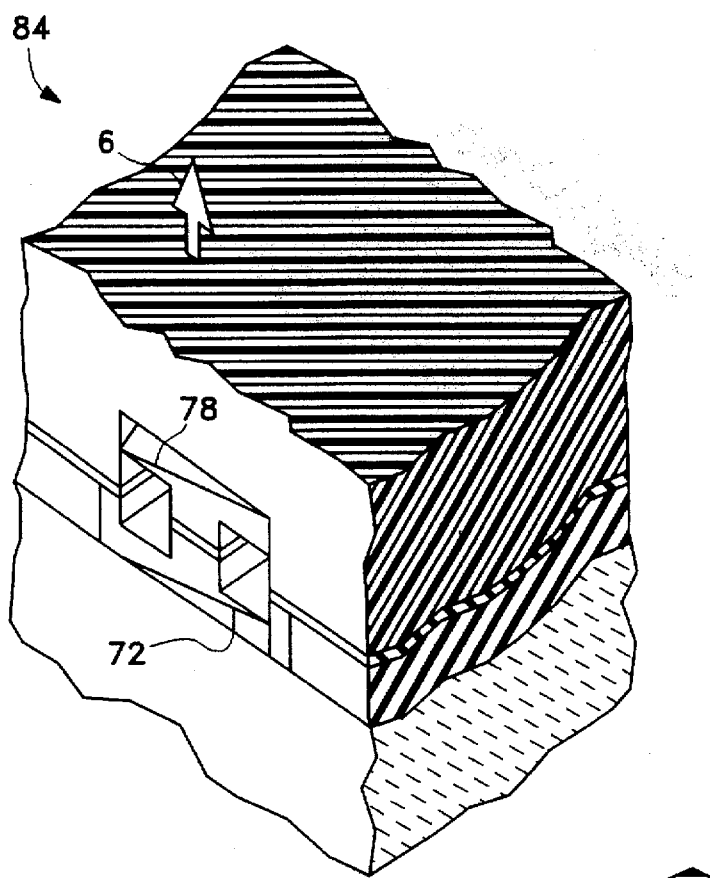
FIG. 10 is another variation of the embodiment shown in FIGS. 7-7B.
Figure 11:
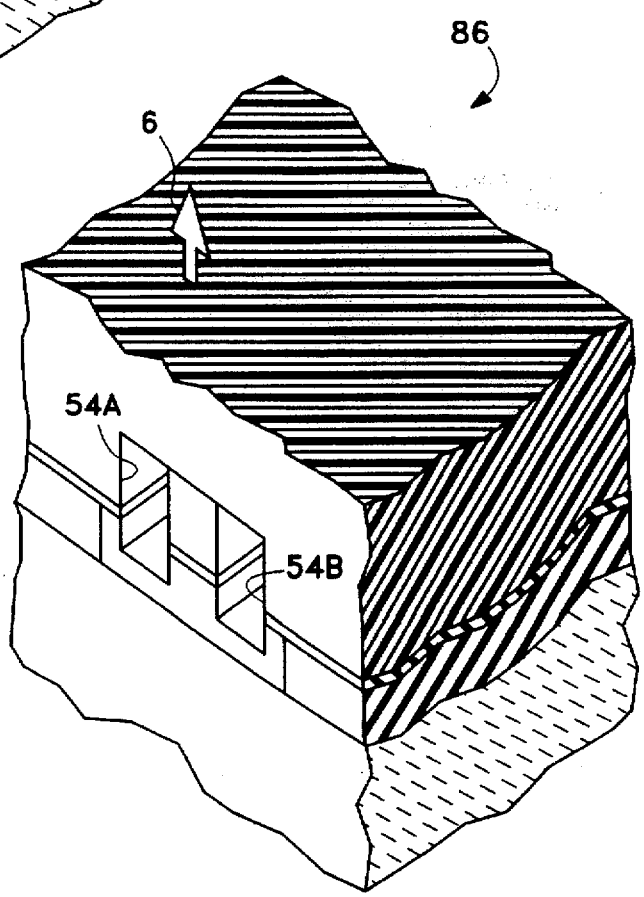
FIG. 11 is still another variation of the embodiment shown in FIGS. 3-3B.
Figure 12:
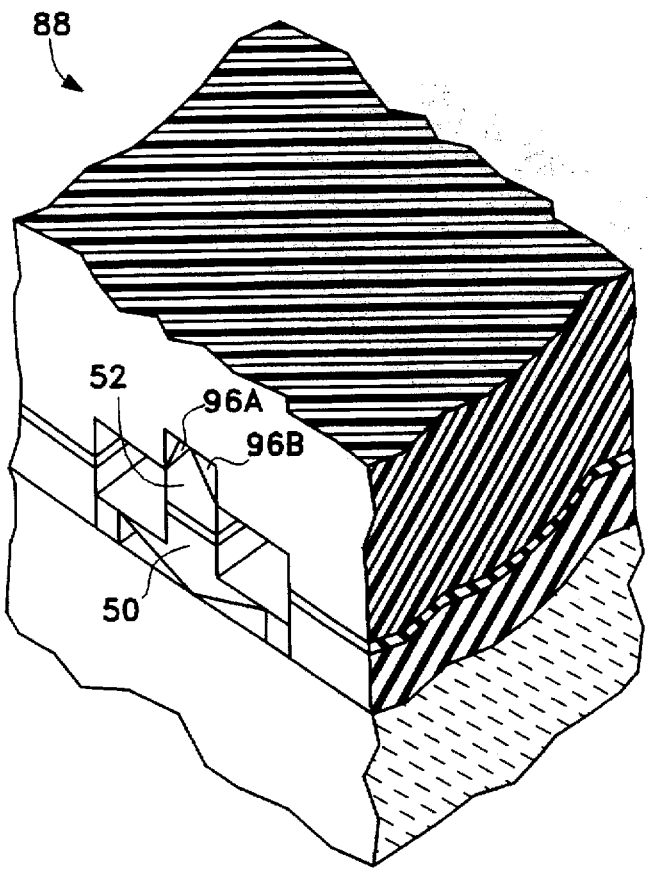
FIG. 12 is another variation of the embodiment shown in FIGS. 7-7B.
Figure 13:
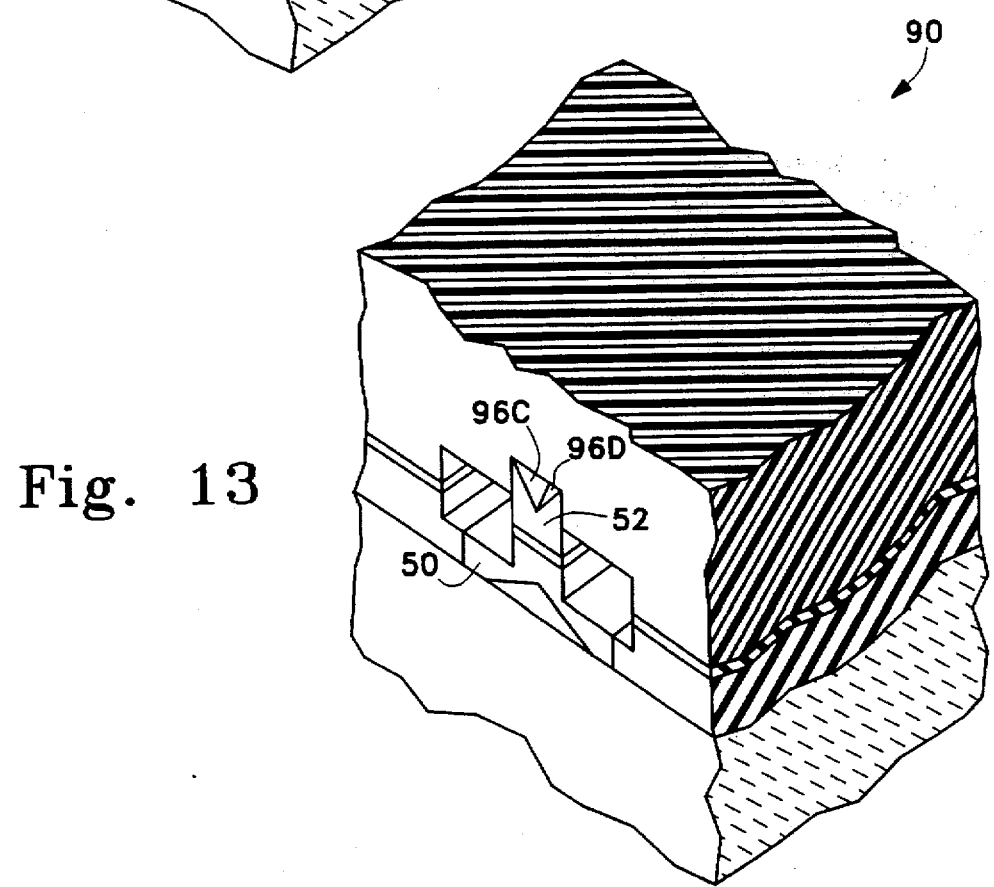
FIG. 13 is yet another variation of the embodiment shown in FIGS. 7-7B.

It should be understood that modifications and variations may be made within the scope of the invention. For example, the bevel surfaces 70 and 76 need not be planar. Instead, the surfaces 70 and 76 can be concave, convex, conical, or stepped, as long as a general surface is defined. Shown in FIG. 8 is a magnetic head 80 having stepped bevel surfaces 70 and 76. FIG. 8A is a cross-sectional side view taken along the line 8A—8A of FIG. 8. Shown in FIG. 9 is a magnetic head 82 having conical bevel surfaces 70 and 76 angularly formed with respect to the corresponding first and second surfaces 50 and 52. Moreover, the leading edge 72 and the trailing edge 78 need not be perfectly perpendicular to the principal direction of movement 6 of the record medium. Shown in FIG. 10 is a magnetic head 84 which is asymmetrical in shape having the leading and trailing edges 72 and 78 at an angle to the principal direction of movement 6. In addition, the trimmed away portions 54A and 54B can extend fully into the tip section 34A of the first pole 34 as shown in the magnetic head 86 of FIG. 11. There can also be more than one bevel surface on each pole. For instance, shown in FIG. 13 is a magnetic head 88 having a pair of bevel surfaces 96A and 96B angularly formed with respect to the second level surface 52. Shown in FIG. 12 is another magnetic head 90 having another pair of bevel surfaces 96C and 96D sloping inwardly with respect to the second level surface 52. The novel approach of the present invention disclosed herein is not restricted to merged MR or inductive magnetic heads, but may be applied to other types of magnetic heads.

What is claimed is:

1. A magnetic head having an air bearing surface with a leading edge and trailing edge for interfacing with a record surface of a magnetic storage medium comprising:

a nonmagnetic substrate;

a first pole layer formed above said substrate and having a front section and a back section, said front section of said first pole layer including a first surface substantially coplanar with the air bearing surface of said magnetic head, said first pole layer being formed by a focused ion beam with a leading bevel surface, said first surface and said leading bevel surface intersecting at said leading edge of said air bearing surface;

an insulating gap layer; and a second pole layer having a tip section and a body section, said tip section of said second pole layer being disposed adjacent to and spaced from said front section of said first pole layer by said insulating gap layer, said body section of said second pole layer being disposed in contact with said back section of said first pole layer.

2. The magnetic head as set forth in claim 1 wherein said first surface comprises trimmed away portions defining a first stepped area adjacent to and extending toward said insulating gap layer.

3. The magnetic head as set forth in claim 1 wherein said tip section of said second pole includes a second surface substantially coplanar with the air bearing surface of said magnetic head, and a trailing bevel surface surface formed with respect to said second surface, said second and trailing bevel surfaces intersecting at said trailing edge.

4. The magnetic head as set forth in claim 3 wherein said second surface includes a boundary having trimmed away portions defining a second stepped area adjacent to and extending toward said insulating gap layer.

5. A magnetic head having an air bearing surface with a leading end and a trailing end comprising:
 a nonmagnetic substrate;
 a first pole formed above said substrate and including a front section and a back section, said front section having a first surface generally coplanar with the air bearing surface of said magnetic head;
 an insulating gap layer; and
 a second pole including a tip section and a body section, said tip section of said second pole being disposed adjacent to and spaced from said front section of said first pole by said insulating gap layer, said body section of said second pole being disposed in contact with the back section of said first pole;
 said first surface of said front section of said first pole being configured with trimmed away portions formed by a focused ion beam for defining a first stepped area adjacent to and extending toward said transducing gap layer, said first stepped area having a smaller width than that of the remaining portion of said first surface.

6. The magnetic head as set forth in claim 5 wherein said tip section of said second pole includes a second surface substantially coplanar with the air bearing surface of said magnetic head, said second surface being configured with trimmed away portions formed by a focused ion beam for defining a second stepped area adjacent to and extending toward said insulating gap layer, said second stepped area having a smaller width than the rest of said second surface.

7. The magnetic head as set forth in claim 6 wherein said first pole includes a leading bevel surface surface formed with respect to said first surface, said first and said leading bevel surfaces intersecting at said leading end of said air bearing surface.

8. The magnetic head as set forth in claim 7 wherein said second pole includes a trailing bevel surface surface formed with respect to said second surface, said second and said trailing bevel surfaces intersecting at said trailing end of said air bearing surface.

9. The magnetic head as set forth in claim 5 including a magnetic shield disposed adjacent to and separated from said first pole by insulating material.

10. The magnetic head as set forth in claim 9, including a magnetoresistive sensor disposed between said first pole and said magnetic shield; and insulating material disposed between said sensor and said shield.

11. The magnetic head as set forth in claim 10 wherein said magnetoresisitive sensor is an anisotropic magnetoresistive sensor.

12. The magnetic head as set forth in claim 10 wherein said magnetoresisitive sensor is a giant magnetoresistive sensor.

13. A magnetic head having an air bearing surface having a leading end and a trailing end comprising:
 a nonmagnetic substrate;
 a first pole formed above said substrate and having a front section and a back section;
 an insulating gap layer; and
 a second pole having a tip section and a body section, said tip section of said second pole being disposed adjacent to and spaced from said front section of said first pole by said insulating gap layer, said body section of said second pole being disposed in contact with said back section of said first pole, said tip section of said second pole including a level surface coplanar with the air bearing surface of said magnetic head, and a trailing bevel surface formed by a focused ion beam, said level surface and said trailing bevel surface intersecting at said trailing end.

14. The magnetic head as set forth in claim 13 wherein said trailing bevel surface comprises a stepped surface.

15. The magnetic head as set forth in claim 13 wherein said front section of said first pole includes a second level surface coplanar with said air bearing surface, and a leading bevel surface surface formed with respect to said second level surface, said leading bevel surface comprising a stepped surface.

* * * * *